(12) United States Patent
Zhuang et al.

(10) Patent No.: US 12,731,137 B2
(45) Date of Patent: Sep. 8, 2026

(54) SYSTEMS AND METHODS FOR INTEROPERABLE BLOCKCHAINS AND CROSS-CHAIN DATA MESSAGE COMMUNICATION

(71) Applicant: HSBC Software Development (Guangdong) Limited, Guangdong (CN)

(72) Inventors: Wei Ming Zhuang, Shanghai (CN); Peng Zhao, Shanghai (CN); Ruxin Hou, Guangdong (CN)

(73) Assignee: HSBC Software Development (Guangdong) Limited, Guangdong (CN)

( * ) Notice: Subject to any disclaimer, the term of this patent is extended or adjusted under 35 U.S.C. 154(b) by 0 days.

(21) Appl. No.: 19/373,609

(22) Filed: Oct. 29, 2025

(65) Prior Publication Data

US 2026/0057379 A1 Feb. 26, 2026

(30) Foreign Application Priority Data

Oct. 30, 2024 (CN) ......................... 202411537952.7

(51) Int. Cl.

*G06Q 20/38* (2012.01)
*G06F 21/10* (2013.01)
*G06Q 20/36* (2012.01)

(52) U.S. Cl.

CPC ....... *G06Q 20/3829* (2013.01); *G06F 21/108* (2023.08); *G06Q 20/36* (2013.01); *G06Q 20/3825* (2013.01); *G06Q 2220/00* (2013.01)

(58) Field of Classification Search

CPC ............... G06Q 20/3829; G06Q 20/36; G06Q 20/3825; G06Q 2220/00; G06Q 20/065;

(Continued)

(56) References Cited

U.S. PATENT DOCUMENTS 11,416,848 B1 * 8/2022 Shetti .................. G06Q 20/065
2019/0043043 A1 * 2/2019 Saraniecki ............ H04L 9/3268

FOREIGN PATENT DOCUMENTS

CN 109391619 A * 2/2019 ............. G06Q 40/04
CN 110546604 A * 12/2019 ............. G06F 7/725

(Continued)

OTHER PUBLICATIONS

"Cross-Blockchain Technology: Integration Framework and Security Assumptions", Babu Pillai, IEEE Access Apr. 13, 2022 (Year: 2022).*

*Primary Examiner* — Duan Zhang
(74) *Attorney, Agent, or Firm* — Dentons Durham Jones Pinegar

(57) ABSTRACT

Systems and methods for enabling secure and efficient interoperability between multiple blockchains, particularly for Central Bank Digital Currency (CBDC) issuance and transfer are described. This architecture allows independent blockchains, each managed by different financial institutions or authorities, to exchange digital assets using a unified cross-chain protocol. Key features include smart contracts for locking, minting, unlocking, and burning digital tokens, relayer subroutines for message transfer, and observer nodes for real-time monitoring and reconciliation. Multi-signature wallets ensure that critical actions require approval from multiple parties, enhancing security and compliance. The system supports both reversible and irreversible cross-chain transfers, dynamic load management, and upgradable smart contracts.

20 Claims, 7 Drawing Sheets

(58) Field of Classification Search
CPC .. G06Q 20/363; G06Q 20/381; G06Q 20/383; G06F 21/108
See application file for complete search history.

(56) References Cited

FOREIGN PATENT DOCUMENTS

| | | | | | |
|---|---|---|---|---|---|
| CN | 111311209 | A | * | 6/2020 | ............... H04L 9/50 |
| CN | 114386954 | A | * | 4/2022 | ......... G06Q 20/3825 |
| CN | 114664011 | A | * | 6/2022 | ......... G07C 9/00309 |
| CN | 117455671 | A | * | 1/2024 | ............. G06Q 40/04 |
| GB | 2612336 | A | * | 5/2023 | ........... G06Q 20/389 |
| JP | 2021182263 | A | * | 11/2021 | |
| WO | WO-2019094797 | A1 | * | 5/2019 | ........... G06Q 20/223 |

* cited by examiner

700
Monetary Authority
710
Bank A
704A
Bank B
704B
Bank C
704C
3. authorize
2. initial transaction
3. authorize
3. authorize
1. deploy new contract
Multi-signature wallet contract
706
4. upgrade
CBDC proxy contract
708
5. update address
CBDC logic contract
new CBDC logic contract
720

SYSTEMS AND METHODS FOR INTEROPERABLE BLOCKCHAINS AND CROSS-CHAIN DATA MESSAGE COMMUNICATION

CROSS REFERENCE TO RELATED APPLICATION

This application claims priority to and the benefit of Chinese Application No. 202411537952.7, filed Oct. 30, 2024, the contents of which are incorporated into the present application by reference.

FIELD

The present application relates to computer architecture for blockchain interoperability and more specifically, to systems and methods for data messaging between interoperable blockchains for cross-chain interactions and interoperability with a third party observer or validator node.

INTRODUCTION

With the development of blockchain technology, digital currencies have emerged as a promising technology for using data messages and decentralized approaches for supporting transactions. In particular, Central Bank Digital Currency (CBDC), as a form of digital currency based on blockchain technology not only enhances the efficiency and security of currency circulation, but also reduces the costs associated with currency issuance and management. Blockchain technology, as the foundation of CBDC, provides secure, decentralized, transparent, and traceable characteristics. However, CBDC faces some design challenges such as the need to ensure high throughput, low latency, privacy, scalability, and interoperability with existing financial systems.

SUMMARY

A technical implementation of CBDC can include multiple blockchains/distributed ledger node networks being operated by different trusted parties. Each of these blockchains/distributed ledger node networks operate independently from one another and provide an immutable record of transactions occurring in relation to the distributed ledger data objects being maintained through interconnected cryptographic blocks on a corresponding blockchain instance. For each of these blockchains/distributed ledger node networks, they may be configured to interface with a central validation authority that utilizes a cryptographic signing mechanism as part of a minting process conducted on each of the blockchains/distributed ledger node networks to generate new data objects that can be transferred to represent one or more transactions relating to ownership transfers from address to address on the individual blockchains/distributed ledger node networks.

Because there are multiple blockchains/distributed ledger node networks that are operating to provide tradable data objects, interoperability between different blockchains/distributed ledger node networks requires a cross-chain protocol.

A cross-chain protocol and corresponding systems and methods are proposed herein. A decentralized blockchain oracle network establishes a two-way communication network between multiple blockchains/distributed ledger node networks by collecting data/consensus on one blockchain/distributed ledger node network and routing it through the oracle network to another. Smart contracts on separate blockchains/distributed ledger node networks may rely on the data gathered by multiple oracles to verify that prerequisite conditions have been satisfied for the execution of transactions between otherwise independent blockchains/distributed ledger node networks.

An example approach for implementation includes blockchains/distributed ledger node networks where each of the trusted parties is a different financial institution, each operating a separate blockchain network but able to interoperate with a central validation authority, such as a secure computer system being operated by a central bank or a monetary authority, which enables minting of specific data objects on the blockchains/distributed ledger node networks that are capable of transferring both intra-blockchain and inter-blockchain (via the proposed cross-chain protocol described herein).

Specifically, the example approach comprises a network of separate blockchains for decentralized commerce using multi-issuer digital currency. As an example of separate blockchains, multiple financial institutions can operate their own blockchain/distributed ledger networks, running protocols that are used for issuing digital currency through their respective blockchains in combination with a digital signing mechanism from a central authority's computing system that is used for minting digitally interactable digital objects that reside on the financial institution-specific blockchain/distributed ledger networks. A benefit of this type of mechanism is that each financial institution has direct technical control over operations on their respective blockchain/distributed ledger network. However, a technical problem that arises is that as not all entities are registered users on a particular blockchain/distributed ledger network, inter-bank transactions become challenging.

For example, if a customer having a digital wallet digitally domiciled on Blockchain A wishes to transact with another customer having a second digital wallet digitally domiciled on Blockchain B, a computing protocol is required to represent the transaction and state changes of the corresponding digital objects (e.g., a locking and minting of a new "wrapped" digital object process as noted herein). In this example, the customer on Blockchain B may then purchase services from a vendor whose digital wallet is digitally domiciled on Blockchain A, and the computing protocol would be required to handle potentially a counterpart transaction where the digital representation of Blockchain A items on Blockchain B may need to be reversed (e.g., unlocking and burning of the "wrapped" digital object).

By using the protocols proposed herein, a technical objective may be to reduce a computing impact/overall system latency as each computing operation has a corresponding computational cost, which, at scale, can impact overall throughput (e.g., as measured by number of transactions processed per minute), computing infrastructure requirements, and lag. As the signing authority (e.g., central monetary authority's computing server) is a central point of communications, a technical objective may be to limit the total number of requests as possible by using the wrapped minting process described herein.

Inter-bank transactions are achieved through a unified cross-chain protocol where coin wrapping protocols allows for interoperability of digital currency between blockchains of independent banks. A central validation authority approves key transactions such as the issuing of new digital currency and the update of smart contracts through a multi-signature wallet. The central validation authority additionally tracks and analyzes the flow of digital data objects (e.g., currency) in real time through dedicated observer nodes introduced into the blockchain network.

The implementation of a multi-chain architecture further enables the deployment of a main chain and multiple dedicated chains for various activities, as well as dedicated chains for third-party payment channels or platforms to handle different types of transactions. This architecture not only enhances the system's transaction processing capacity and scalability but also ensures the stability and efficiency of the main chain, effectively supporting large-scale and high-frequency transaction demands.

Utilizing cross-chain protocols allows for the transfer of value and data between different chains by establishing interoperability, which is crucial for achieving flexibility and widespread adoption of CBDCs. Through this method, CBDCs can circulate rapidly between different blockchains and payment systems, enhancing their liquidity and functionality. A coordinated approach to cross-chain transfers in accordance with a protocol described herein additionally allows for the participation of other individuals, enterprises, and financial institutions in blockchain development and maintenance. This not only increases the transparency and trustworthiness of the system but also promotes continuous innovation and improvement in technology. Where separate blockchains and distributed ledger networks are utilized, the system is also more resilient to technical failure points, which may arise in the adoption of nascent technology.

As described herein, a variant embodiment includes a variation of the cross-chain protocol adapted for interoperability or usage by the central validation authority to be able to computationally efficiently and accurately execute one or more query data processes against the blockchain/distributed ledger node networks so that transactions across the different blockchains/distributed ledger node networks where the cross-chain protocol is invoked can be automatically coupled with one another for the purposes of transaction traversal.

The proposed multi-blockchain system emphasizes the protection of user and transaction privacy through physical and data isolation. Transactional data is generated and stored independently on the source blockchain and the destination blockchain. This data is only accessible by the blockchains/distributed ledger node networks and by a central validation authority through an observer node. This ensures a balance between regulatory observability and privacy protection. On one hand, user data is contained within the banks' internal systems. Other parties do not have access to view the transactional information, ensuring that sensitive data is not accessed by competitors or malicious third parties. On the other hand, central validation authoritiescan monitor transactions through the embedded observer nodes and track transactions in the event of non-compliant operations or security incidents. This design not only meets the privacy protection requirements of modern digital currencies but also satisfies regulatory requirements for preventing money laundering and financial fraud.

The system of blockchains can additionally implement upgradable smart contracts comprising a proxy contract and a logic contract. While proxy contracts are immutable, logic contracts can be upgraded via rerouting the user request from the proxy contract to a new logic contract.

In the upgrade process, financial regulatory authorities may play an overseeing role in reviewing the legal and policy compliance of the proposed changes; and other issuing banks could additionally contribute to jointly ensure the rationality of the proposed upgrades. The system can accommodate this by implementing a multi-signature wallet, in which key holders and a preset signature threshold are defined in a smart contract according to a key operation; the key holders authorize the key operation on the smart contract; the smart contract then records the number of authorizations; and the key operation is automatically executed once the number of authorizations matches the preset signature threshold.

The multi-signature wallet can be further implemented in the digital currency issuance process, in which the key holders comprise the issuing banks and the central validation authority, and the key operation is the issuance of digital currency by the issuing bank. The central validation authority could utilize the multi-signature wallet to ensure that the issuing banks have satisfied deposit requirements and that the issuing of new digital currency complies with its policy objectives.

In another variation, each of the trusted parties may be a jurisdiction/country specific institution, and the central validation authority can include a global level issuing authority, and the cross-chain technology can provide a common framework for different CBDCs to securely and efficiently interconnect globally. For instance, central banks of different countries can achieve compatibility and mutual recognition of their respective CBDCs through shared technical platforms and standards.

The foregoing has outlined rather broadly the features and technical advantages in order that the detailed description that follows may be better understood. Additional features and advantages will be described hereinafter. It should be appreciated by those skilled in the art that the conception and specific embodiment disclosed may be readily utilized as a basis for modifying or designing other structures. It should also be realized by those skilled in the art that such equivalent constructions do not depart from the spirit and scope of the embodiments described herein.

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the embodiments described herein.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
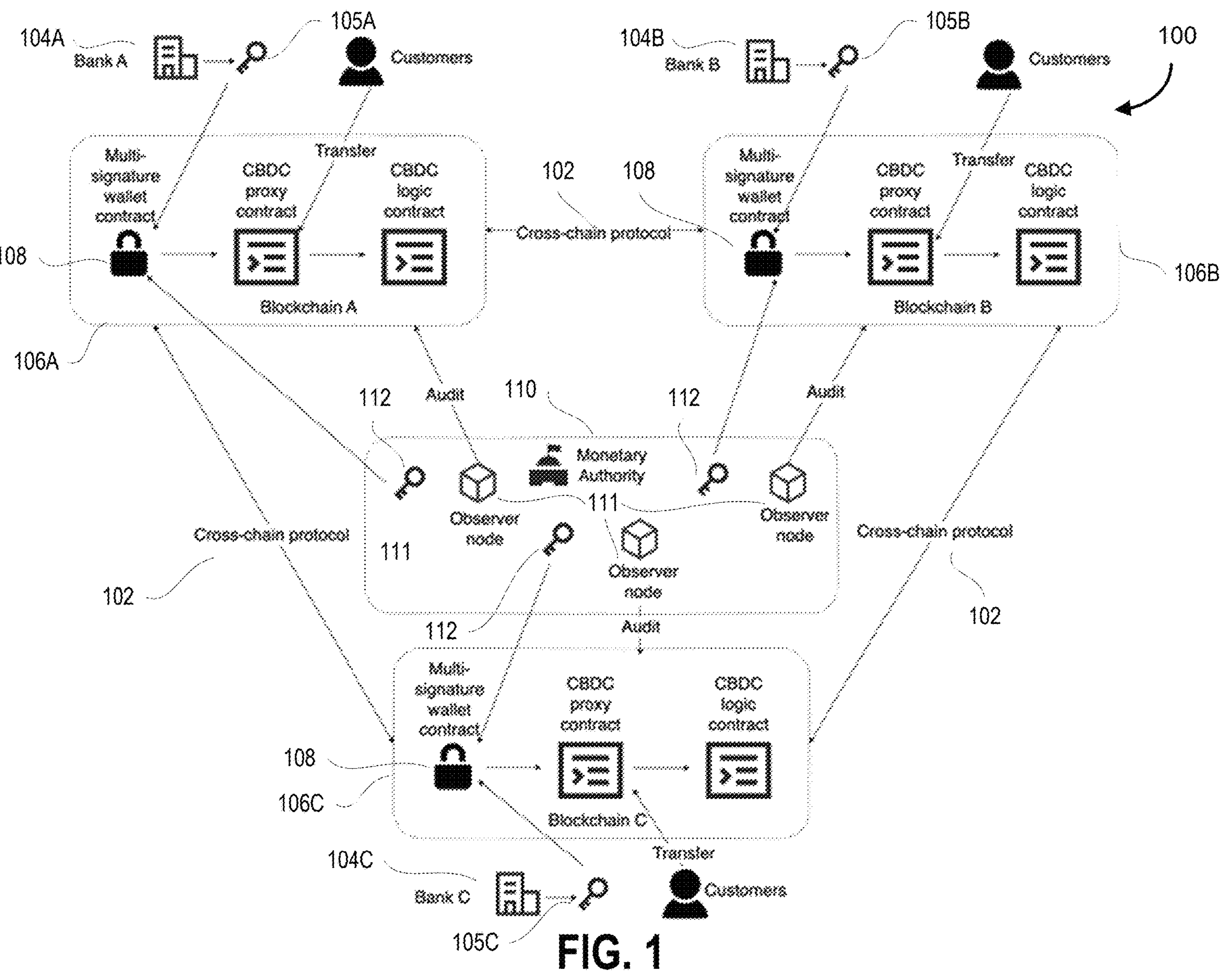
FIG. 1 is a block diagram of a system for multi-issuer CBDC transaction and management in accordance with some embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The Central Bank Digital Currency (CBDC) issued by the Chinese government (e-CNY) has implemented a dual-layer operating model to adapt to the needs of the modern financial system and enhance operational efficiency. In this architecture, a central bank (e.g., People's Bank of China) serves as the core authority responsible for the issuance and withdrawal of the e-CNY, ensuring the stability of currency supply and its value. This hierarchical management not only includes the execution of monetary policy and control of currency supply, but also encompasses strict supervision of the issuance process to prevent inflation and maintain financial stability. The second layer consists of commercial banks and payment companies, which act as designated operational entities responsible for distributing the e-CNY to the public and handling daily circulation activities. This layer's design fully utilizes the extensive service networks and large customer bases of commercial banks and payment institutions, providing a solid foundation for the popularization and acceptance of the e-CNY. Meanwhile, through regulatory oversight and technical support from the central bank, systemic financial risks are effectively reduced.

A benefit of this type of mechanism is that each financial institution has direct technical control over operations on their respective blockchain/distributed ledger network. However, a technical problem that arises is that as not all entities are registered users on a particular blockchain/distributed ledger network, inter-bank transactions become challenging.

The e-CNY system incorporates a unique mechanism of "controllable anonymity," allowing users to open anonymous e-CNY wallets via their mobile phone numbers. In this system, the central bank can track and analyze transaction data to prevent financial fraud and money laundering activities but cannot access users' real identity information, thus protecting user privacy. At the same time, telecom operators hold users' real identity information but are not authorized to access their transaction details. This information isolation ensures a certain degree of user privacy protection while complying with national laws and regulations.

When evidence of criminal activity arises, law enforcement agencies can lawfully obtain the suspects' real identity information through telecom operators and banks. This design not only meets the public's demand for anonymity but also ensures that law enforcement agencies can effectively combat crime, achieving the optimal balance between security and privacy.

The central bank adopts a centralized management model in the e-CNY system, maintaining comprehensive control over the e-CNY throughout its entire lifecycle. As designated operational entities, commercial banks are not only responsible for the initial exchange of e-CNY but also for its circulation among the public. Additionally, commercial banks and relevant payment institutions provide exchange and transaction services to users, ensuring the liquidity and acceptability of the e-CNY. Through this model, the central bank ensures the efficient operation and policy execution of the e-CNY system, reinforcing its central position in the modern digital economy.

Currently, this centralized management model of the e-CNY system faces some technical challenges. "Controllable anonymity" may allow for user privacy protection while permitting regulatory agencies to view transaction details under specific conditions. However, it is difficult to implement this in view of computing limitations. Facilitating cross-border transactions is a crucial aspect of the e-CNY's development goals. Despite aiming to simplify transactions and reduce costs, the technical architecture behind the e-CNY is technically complex, involving distributed ledger technology, encryption measures, and high system security requirements. Implementing and maintaining these technologies requires significant initial and ongoing investments. As noted herein, variants are also proposed to manage computing load using an adaptive variation of a cross-chain protocol to help control when more computationally intensive steps are undertaken. This technical improvement helps the system achieve operation at scale (e.g., serving a high volume of simultaneous users) and maintain an acceptable level of transactional throughput.

The e-CNY relies heavily on advanced technologies such as blockchain and encryption methods. Rapid changes in these technologies may necessitate frequent system updates to maintain security and efficiency, increasing operational costs. Additionally, ensuring compatibility with existing financial systems is crucial to seamlessly integrate new and old systems and avoid transaction delays and a decline in user experience.

In addressing the many aforementioned deficiencies and challenges, the present disclosure describes an issuance and management architecture for a CBDC on a blockchain network with multiple issuing banks, leveraging cross-chain technology. Each issuing bank deploys and manages its independent blockchain that implements the cross-chain protocol and issues its own CBDC smart contract to handle routine transactions and provide basic currency management functions, including issuance, transaction recording, redemption, and upgrades.

The purpose of the proposed system is to issue and manage CBDC through cross-chain technology, providing a solution that optimizes currency circulation, enhances transaction processing capabilities, protects data privacy, and improves user experience more effectively.

There are two viable models to manage cross-chain tokens: the Burn & Mint Model and Lock & Mint Model. In a cross-chain transaction utilizing the Burn & Mint Model, assets on the source chain (e.g., a first blockchain) are permanently destroyed (burned), and equivalent new tokens are minted on the target chain (e.g., a second blockchain such as, for example, an Ethereum blockchain), meaning that the original assets no longer exist on the source chain and are fully transferred to the target chain. Since assets are burned on the source chain, liquidity is fully transferred to the target chain, reducing liquidity on the source chain. Since the assets are permanently burned on the source chain, the transfer process is irreversible. Once burned, the only way to access the value is through the tokens on the target chain. This irreversibility forces the Burn & Mint Model to rely on a strong consensus mechanism between the source and target chains.

In the Lock & Mint Model, assets on the source chain are locked in a smart contract rather than being destroyed. Equivalent new tokens are then minted on the target chain ("wrapped CBDC"). The original assets remain on the source chain but are temporarily inaccessible ("locked"). There should be an equivalent wrapped CBDC for every locked data object. A benefit of this approach is that in minting the wrapped CBDC object, there is no need to undergo a minting process requiring monetary authority signature. The two blockchains use the cross-chain protocol, which can be practically implemented as smart contracts operating based on control instructions by a re-layering process that is configured to facilitate message transfers between two blockchains whenever there is a request to transfer digital objects represented on a source blockchain to a target blockchain (i.e., where the user wallets are domiciled on different blockchains because the users are customers of different financial institutions). Whenever the relayer is called, the relayer interacts with the configured smart contracts on both the source blockchain and the target blockchain to initiate a lock & mint, or a corresponding unlock & burn mechanism (e.g., if a wrapped CBDC is being used for a transaction where there is a corresponding locked CBDC already). Some level of liquidity on both the source and target chains remains since assets still exist on the source chain in locked form. Since the assets are merely locked and not destroyed, they can be recovered through an unlocking process. The Lock & Mint Model therefore provides reversibility, allowing users to transfer the assets back to the source chain if needed. The Lock & Mint Model method relies on the security of the smart contract where the assets are locked. If the locking mechanism has vulnerabilities, it could lead to asset theft or loss. As part of the Lock and Mint model, the relayer can receive a signed transaction request corresponding to a request to transfer a digital object represented on the first distributed ledger data structure (e.g., a source blockchain) to a second distributed ledger data structure (e.g., a target blockchain).

Each digital object may be associated with a public key representative of an "owner address", and the signed transaction request can be signed using the corresponding paired private key, the private key generated as part of a key generation process and known to the owner address to be used as a proof of authorization for transfer. The relayer verifies the signed message and then sends corresponding data messages to the coupled smart contracts to facilitate message transfer between two blockchains. The original transaction requests can be sent, for example, using digital wallet applications (e.g., such as a mobile application) that operate as user clients. In the Lock & Mint model proposed herein, each digital wallet is coupled with all of the digital objects on a particular domiciled blockchain that corresponds to the public key of the owner's address. As noted herein, the digital objects can include a mix of native CBDCs that are native to the domiciled blockchain, and wrapped CBDC that are not native but generated as part of a lock & mint model with another blockchain. These can be identified using pointers or through a blockchain traversal using a block explorer query. In some embodiments, from a user's perspective, wrapped and native CBDC objects are fungible and there may not be a specific distinction between the different objects. Where there are more than two blockchains operating together, it is important to note that it is possible that there are different types of wrapped CBDC (e.g., wrapped relative to blockchain 2 or blockchain 3).

When the user client/digital wallet application receives a request to transfer CBDC objects to a wallet domiciled on another blockchain, the user client/digital wallet application can be configured to automatically determine whether to use wrapped CBDC corresponding to that target blockchain, wrapped CBDC corresponding to different blockchain, or native CBDC. As described herein, in some embodiments, a transactional load or wrapped/native balance of the source or the target blockchain (or both in some embodiments) can be measured and used in the determination whether to use wrapped CBDC corresponding to that target blockchain, wrapped CBDC corresponding to different blockchain, or native CBDC. The determination can be made based on a query of a blockchain status oracle associated with a particular blockchain. In some embodiments, during times of high transactional load or undesirable balance, the cross-chain protocol smart contracts are configured to impose a variable transaction cost or reward to encourage wallet applications in the determination to use wrapped CBDC corresponding to that target blockchain, wrapped CBDC corresponding to different blockchain, or native CBDC. The variable transaction cost or reward can be proportionate to the level of imbalance (e.g., as measured by a block explorer query) or transactional load (e.g., as measured by network latency, confirmation delays, processing latency).

The transaction request may require a signed message using the private key corresponding to a public key listed as the owner of the digital object to verify that the transaction request comes from the owner. Once verified, the data field parameter on the digital object being transferred is modified to change the digital object state representation to locked, generate a locked object identifier and a signed locking attestation. The cross-chain transaction occurs by the relayer forwarding a data object of transaction information to a target computing node associated with the second distributed ledger data structure.

The data object of transaction information include the signed locking attestation and the target computing node then generates a corresponding wrapped digital object on the second distributed ledger data structure as a wrapped representation of the digital object being transferred. The corresponding wrapped digital object includes, as a data record payload, the signed locking attestation and the locked object identifier. Observer nodes described herein can track the attestations and generation receipts to ensure that the cross-chain protocols and their corresponding smart contracts are not being misused to generate wrapped tokens on a blockchain that do not have a locked counterparty token on another blockchain.

The wrapped CBDC representation can then be transferred among user wallets electronically domiciled on the target blockchain/distributed ledger network and treated similarly to native CBDC. When a user domiciled on one blockchain attempts to transfer wrapped CBDC to a user domiciled on the other blockchain, an opposite unlock and burn transaction occurs, yielding a native CBDC token in the target wallet. As noted herein, in a variation, the determination of whether a wrapped CBDC or a native token is transferred, and a proportion thereof can be used to control the frequency of computationally expensive unlock and burn transactions, is a useful mechanism for computational load management can be established.

In summary, both the Burn &Mint Model and the Lock &Mint Model have their own advantages and disadvantages. Although the Lock & Mint Model is chosen to illustrate the cross-chain process described herein, in a variant, the Burn & Mint Model can be substituted into the same process.

Through a multi-chain architecture, the proposed solution eliminates intermediaries from CBDC transactions, allowing currencies to be exchanged and settled more flexibly and conveniently among different commercial banks. This reduces transaction costs and time delays, enhancing the overall efficiency of the financial system. Each note-issuing bank deploys blockchains independently, achieving physical isolation of data. This ensures that transaction data of bank customers cannot be accessed by other banks, thereby protecting data privacy and preventing unauthorized access and data leaks.

The proposed solution emphasizes the use of a unified cross-chain protocol for all blockchains, without imposing restrictions on the application layer and consensus layer. This open architecture design allows major commercial banks and institutions to flexibly customize or extend technological applications according to their own business needs, ensuring the long-term adaptability and forward-looking nature of the system. With the application of cross-chain protocols, the exchange of value between domestic CBDCs, other public chain projects, and CBDCs of other countries becomes possible, seamlessly integrating into the global financial network. This promotes cross-border transactions and financial cooperation, enhancing the global connectivity of financial markets.

By using the cross-blockchain protocols proposed herein, a technical objective may be to reduce a computing impact/overall system latency associated with the "mint CBDC" or "upgrade contract" functions as each computing operation, especially those where there are multiple private key holders co-signing has a corresponding computational cost, which, at scale, can impact overall throughput (e.g., as measured by number of transactions processed per minute), computing infrastructure requirements, and lag. As the signing authority (e.g., central monetary authority's computing server) is a central point of communications, a technical objective may be to limit the total number of requests as possible by using the wrapped minting process described herein.

In a cross-chain transaction scenario, a simple method is to permanently burn a token on the source chain and then mint an equivalent new token on the target chain. However, if the minting of new tokens on the target chain is done directly by the users, many potential points of exploit exist for nefarious users to disrupt the system. A trusted administrator thus becomes necessary for the proper functioning of this scenario. However, the administrator's role would entail manual review and maintenance, which creates congestions and bottlenecks when the volume of transactions increases. Additionally, introducing unnecessary administrative roles could lead to security vulnerabilities, as the concentration of control in a single account might jeopardize the entire blockchain's funds if the single account is compromised.

The implementation of cross-chain protocols would allow assets and data to be transferred across various blockchain ecosystems without requiring users to trust a single centralized authority that is prone to problems. The user experience is also significantly improved by the transfer of assets between chains without needing to understand the complexities of the burning and minting processes. This is crucial for the widespread adoption of blockchain technology.

As noted herein, an objective is also to ensure the scalability of the system, and avoiding a processing bottleneck at the monetary authority systems by reducing the total number of required signing events by the monetary authority systems by utilizing cross-chain interoperability digital objects. For example, if a customer having a digital wallet digitally domiciled on Blockchain A wishes to transact with another customer having a second digital wallet digitally domiciled on Blockchain B, a computing protocol is required to represent the transaction and state changes of the corresponding digital objects (e.g., a locking and minting of a new "wrapped" digital object process as noted herein). In this example, the customer on Blockchain B may then purchase services from a vendor whose digital wallet is digitally domiciled on Blockchain A, and the computing protocol would be required to handle potentially a counterpart transaction where the digital representation of Blockchain A items on Blockchain B may need to be reversed (e.g., unlocking and burning of the "wrapped" digital object).

Referring to FIG. 1, diagram illustrating aspects of a system for multi-issuer CBDC transaction and management in accordance with embodiments of the present disclosure is shown as a system 100. The system 100 may be configured to implement the same cross-chain protocol 102, allowing the transfer of value and data between blockchains managed by different issuing banks 104A, 104B, and 104C without the need for a centralized exchange or intermediary. Each issuing bank 104 is only responsible for managing its own blockchain 106, and transaction data is not shared among issuing banks 104, eliminating the risk of customer data leakage. The CBDC can be transferred through the cross-chain protocol 102, facilitating the quick and convenient transfer of customer assets between different banks 104. Additionally, through the deployment of dedicated chains, the system can effectively address sudden large-scale transaction demands without impacting the performance of the main chain.

Since the CBDC is an asset managed by multiple parties, its management involves various stakeholders, including but not limited to a government monetary authority 110 and issuing banks 104. Key transactions require multi-party authorization by the multiple parties. To meet this need, this proposal suggests using multi-signature wallet contracts 108. This technology ensures that transactions can only be executed when the private keys held by government financial regulatory authorities 112 and the private keys held by issuing banks 105 are jointly involved. Each private key holder has a share of the multi-signature wallet 108, increasing the security and compliance of transactions.

In the design of the CBDC smart contract, administrator-related functions play a crucial role. For instance, the "mint CBDC" function allows authorized financial regulatory authorities or banks to create new CBDCs according to economic policies and market demands. Additionally, the "upgrade contract" function allows necessary upgrades or modifications to the smart contract code to adapt to new regulations, technical updates, or bug fixes. Such upgrades typically require a rigorous review and approval process.

When key operations such as "mint CBDC" or "upgrade contract" need to be performed, multiple private key holders must co-sign the transaction. The transaction must reach a preset signature threshold to be executed. This means that a sufficient number of authorized entities must agree for the transaction to be accepted by the blockchain network. Once the signature threshold is reached, the transaction is automatically executed, and the corresponding smart contract function is called. This approach not only enhances the security of the system but also increases transparency, as all parties involved can view the progress and status of the transaction. The upgrade contract function can also be used to modify the operation of the smart contracts supporting the cross-chain protocol, and can be used to change the reward/penalty mechanism that is used to encourage the user client in automatically determining whether to use wrapped CBDC or native CBDC.

Multi-signature wallet technology also helps ensure that all operations comply with preset rules and standards, thereby enhancing the compliance of the CBDC system. This design ensures that only authorized entities can perform key operations while protecting the entire system from unauthorized interference.

For effective supervision and regulation by government authorities, the proposed system introduces observer nodes 111 into the blockchain network, equipping financial regulatory bodies with more advanced supervisory capabilities. Observer nodes 111 can track and analyze the flow of digital currency in real time, ensuring the transparency and compliance of transactions. This real-time monitoring mechanism greatly improves the efficiency of supervision, enabling regulatory bodies to quickly identify and respond to potential financial risks and non-compliant operations, thereby safeguarding the stability and security of the financial market.

An observer node in a blockchain network is a special type of node whose primary function is to listen to and record data and events on the blockchain. Unlike full nodes, observer nodes do not participate in transaction validation or block generation. Observer nodes are typically used to monitor network activity, collect data, and provide analysis. The main functions of observer nodes include data listening and recording, data analysis, and sending alerts and notifications when abnormal activities are detected. The observer node may be a special physical computer or set of computers that operate in conjunction with the computing nodes that maintain the corresponding distributed ledger.

In some embodiments, observer nodes can include physical computers that comprise a blockchain client, event listeners, data storage, and data analysis tools. The blockchain client enables the observer node to communicate with the blockchain network through, for example, an application programming interface or a command line interpreter; event listeners are used to listen for specific blockchain events (such as transactions and block generation); data storage is used to save the listened data into a database; and data analysis tools analyze the collected data to generate visual reports or real-time monitoring dashboards.

In some embodiments, observer nodes are integrated into the blockchain network by running a blockchain client, configuring listeners, and setting up data storage and analysis tools. Observer nodes can be deployed anywhere as long as they are able to communicate with the blockchain network. Usually, observer nodes are deployed in data centers or cloud environments to ensure high availability and reliability. The observer nodes periodically or continuously generate records of some or all transactions recorded on a corresponding blockchain that the observer node is coupled to. As described herein, one or more observer nodes are coupled to each individual blockchain and can be configured to monitor operation of the cross-chain protocol smart contracts. The monitoring can include generating records of all lock/mint wrapped and unlock/burn wrapped transactions.

The observer nodes can be used to provide an overall sanity check where two observer nodes operating on two different blockchains can reconcile with one another to ensure that for every lock operation, there is a corresponding mint operation, and vice versa for unlock/burn wrapped token operations. Similarly, the observer nodes can also be configured to reconcile, over a period of time, the total number of locked/wrapped tokens to ensure that there is a same number of locked and wrapped tokens across the network. Finally, the observer nodes can also be configured to reconcile lock/unlock and minting/burning of wrapped tokens over time.

In some embodiments, for each blockchain, there is a first set of observer nodes observing on-chain transactions, and a second set of observer nodes observing smart contract(s) for cross-chain transactions that are on chain. A global reconciliation network is established through observer nodes of every chain being coupled together to generate a complete record of all on-chain transactions and cross-chain transactions such that every transaction can be accounted for in the system despite the complexity of cross-chain interactions. The global reconciliation network can be used, for example, to conduct economic research, to ensure validity and cybersecurity of the system, and in some embodiments, to automatically encourage balanced operation of the system.

In an example embodiment, the global reconciliation network is configured to monitor, for each blockchain, a proportion of wrapped vs. native tokens (or locked vs. native tokens), and if the proportion of wrapped vs. locked tokens grows beyond a pre-defined threshold, the global reconciliation network can either cause the system to prefer unlock/burn of wrapped token transactions, or force a rebalancing by causing wrapped tokens to be transmitted to a monetary authority related burn address to be swapped for native tokens the particular blockchain. In some embodiments, the rebalancing may be configured to operate during low transaction volume hours, such as overnight, to reduce overall system impact.

Figure 2:
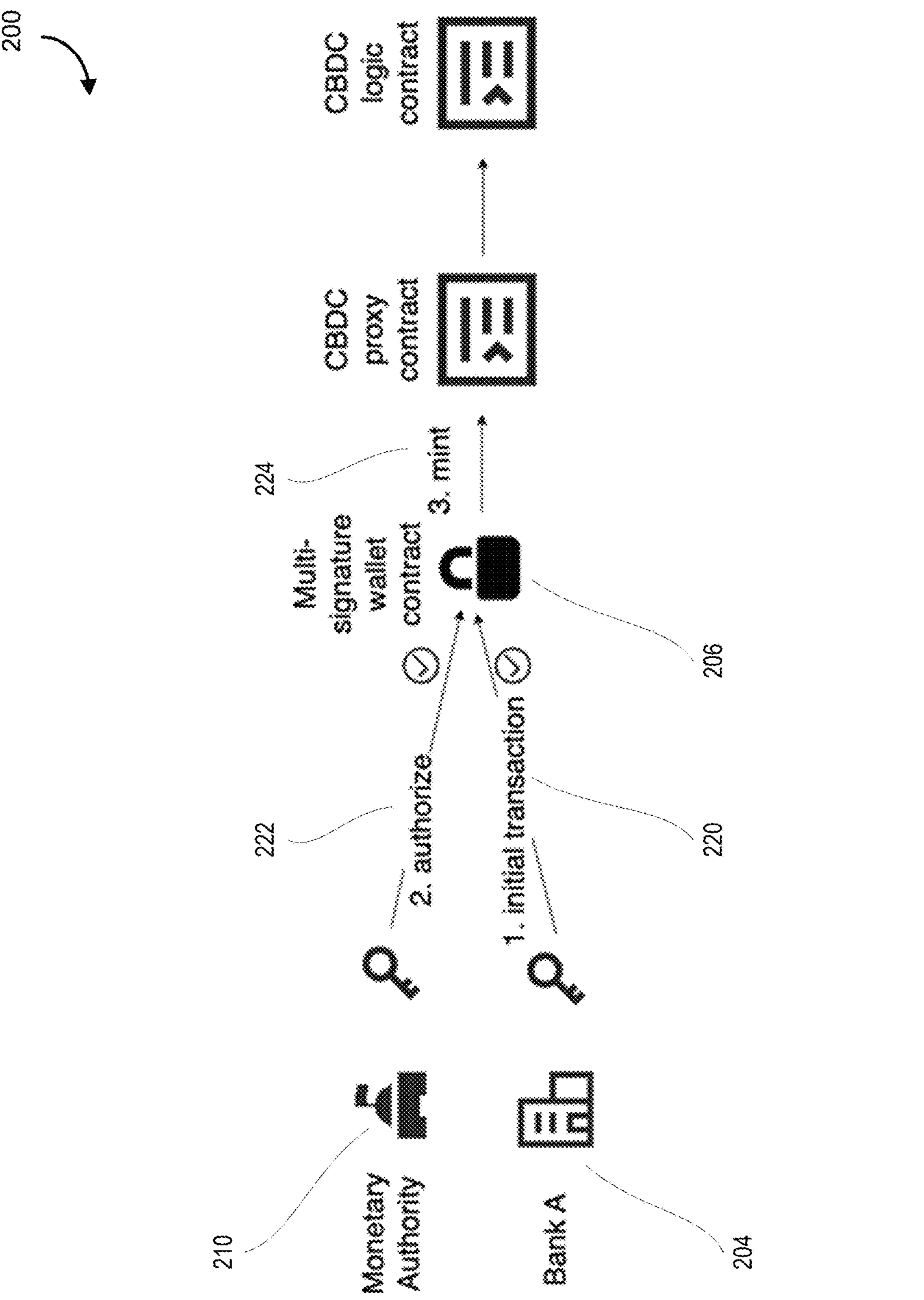
FIG. 2 is a block diagram of a system for multi-issuer CBDC issuance in accordance with some embodiments.

Referring to FIG. 2, block diagram illustrating aspects of a system for multi-issuer CBDC issuance in accordance with embodiments of the present disclosure is shown as a system 200. When issuing CBDC, the issuing bank 204 must undertake some preparatory work before the minting process. Initially, the bank must ensure that it has sufficient currency reserves, which are typically held in the form of fiat money. These reserves must be deposited into a designated institution or fund at a predesignated ratio to ensure that the value of the CBDC is fully supported. This ratio is generally set at 1:1.

Once the currency reserves are in place, the system 200 begins with the issuing bank 204 initiating a "mint CBDC" initial transaction request 220 to the multi-signature wallet 206. This request is an initial transaction that marks the beginning of the CBDC issuance process. The transaction request includes the quantity of CBDC to be issued and relevant metadata.

Government financial regulatory authorities such as monetary authority 210 play a pivotal role in this process. They are responsible for reviewing the currency reserves and issuance requests submitted by the issuing bank. The regulatory authorities check whether the newly added currency reserves match the quantity of CBDC to be issued and ensure that all internal approval processes have been completed.

Once the monetary authority 210 has confirmed the consistency of the currency reserves and issuance request, and the internal approval processes have been passed, it initiates a second transaction, the "authorize" transaction 222. This transaction is an authorization confirmation for the issuing bank's "mint CBDC" transaction.

In the multi-signature wallet 206, a transaction must reach a preset signature threshold to be executed. In some scenarios such as a minting request, the threshold is 2. Once the monetary authority 210 initiates the authorization transaction, and the number of signing entities reaches this threshold, the "mint CBDC" transaction 224 is automatically executed.

With the automatic execution of the "mint CBDC" transaction, new CBDC is successfully minted and transferred to the issuing bank's account address. This process not only ensures that the issuance of CBDC is transparent and compliant but also improves the security and efficiency of the entire procedure.

For intra-bank transfers, the CBDC smart contract transfer function can be used directly.

Figure 3:
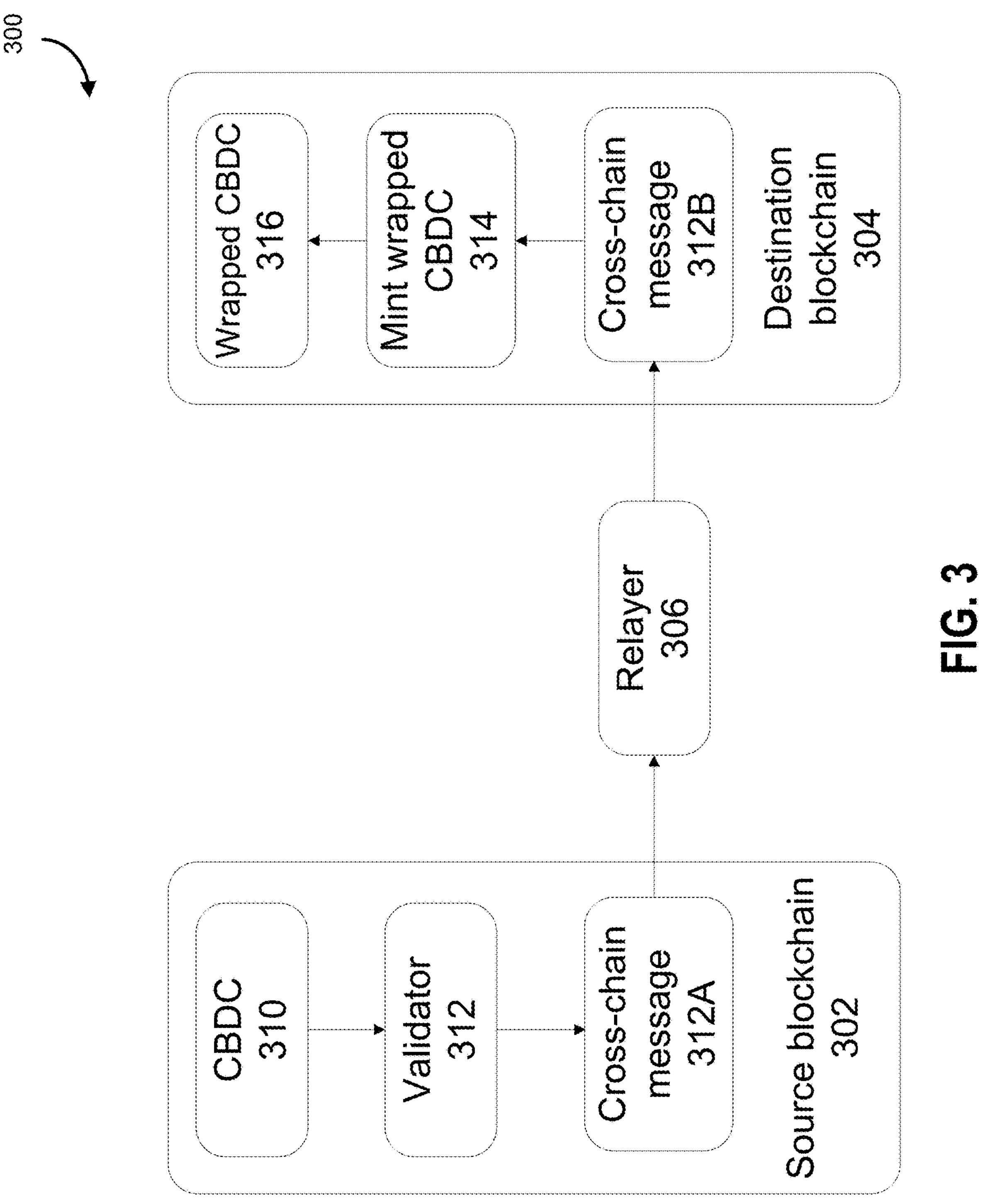
FIG. 3 is a block diagram of a system for a cross-chain protocol in accordance with some embodiments.

For inter-bank transfers, block diagram in FIG. 3 illustrates aspects of a system for a cross-chain protocol 300. Since the underlying blockchain supports cross-chain protocols, if a user holds CBDC 310 on the source blockchain 302 of one bank and decides to transfer it to the destination blockchain 304 of another bank, the following process is initiated.

First, the user initiates a cross-chain transfer transaction on the source blockchain with the goal of transferring CBDC 310 to the destination blockchain. A special smart contract is pre-deployed on both the source blockchain and the destination blockchain to facilitate any cross-chain transfers. The user transfers the CBDC 310 on the source blockchain 302 to this smart contract, and the validator 312 on the source blockchain verifies the validity and authenticity of the transaction, locks the CBDC into a contract, creates and signs a cross-chain message 312A. Simultaneously, the smart contract triggers an event that records which user transferred how much CBDC to the contract. The observer node tracks all CBDC transfer events on the contract and records it in its database.

The relayer 306 continuously monitors relevant cross-chain events on the source blockchain. When the relayer 306 detects a cross-chain message 312A that has been signed by the validators, it fetches the message from the source blockchain and transmits it to the destination blockchain. As noted herein, the relayer is configured to play an important role in managing operation of a smart contract on a source blockchain, and a corresponding smart contract on the target blockchain. Given the potential cybersecurity vulnerabilities of the cross-chain protocol, the relayer 306 can be configured to conduct periodic or triggered reconciliations to ensure that the relayer 306 is conducting balanced operation. This reconciliation process can be conducted, for example, by polling corresponding observer nodes periodically.

Upon receiving cross-chain message 312B, the destination blockchain 304 first verifies the validity of the multiple signatures included in the message to ensure its integrity and authenticity. Once the message is verified, the pre-deployed smart contract on the destination blockchain 304 mints wrapped CBDC 314 based on the information in the message and transfers it to the user's address on the destination blockchain 304. At the same time, the smart contract on the destination blockchain 304 triggers an event that records which user received how much wrapped CBDC. Finally, the user claims the transferred wrapped CBDC 316 on the destination blockchain, completing the entire cross-chain transfer process.

The cross-chain protocol 300 also includes inserting data payloads and fields associated with the locking/unlocking/mint (wrapped)/burn (wrapped) approaches to allow for the observer nodes of the monetary authority to be able to track and audit cross-chain protocol object transactions. The observer node tracks all relevant minting events on the contract and records it in its database.

Through cross-chain protocol 300, the relayer 306 establishes a reliable message transmission channel between the source blockchain 302 and the destination blockchain 304, ensuring that the user's cross-chain transfer transaction can be completed safely and efficiently. This process not only guarantees the transparency and traceability of the transaction but also enhances the overall system's security and reliability through multiple layers of verification.

In the reverse order, if a user holds wrapped CBDC on the destination blockchain and decides to transfer it to the source blockchain of another bank, the following process is initiated: first, the user initiates a cross-chain transfer transaction on the destination blockchain with the goal of transferring the wrapped CBDCs back to the source blockchain. To facilitate this process, a special smart contract is pre-deployed on both the destination blockchain and the source blockchain. The user transfers the wrapped CBDC from the destination blockchain to the smart contract, thereby burning the wrapped CBDC in the contract.

Simultaneously, the smart contract triggers an event that records which user transferred how much wrapped CBDC to the contract. The observer node tracks all wrapped CBDC transfer events on the contract and records it in its database. Additionally, this special event is verified and signed by multiple validators on the destination blockchain to ensure its authenticity and validity.

The relayer continuously monitors for wrapped CBDC transfer events on the destination blockchain. When it detects a cross-chain message that has been signed by the validators, it fetches the message from the destination blockchain and transmits it to the source blockchain. Upon receiving the cross-chain message, the source blockchain verifies the validity of the multiple signatures included in the message to ensure its integrity and authenticity. Once the message is verified, the pre-deployed smart contract on the source blockchain releases (unlocks) an amount of CBDC based on the information in the message and transfers it to the user's address on the source blockchain.

In some instances, a single user could own a mixed collection of CBDC and wrapped CBDC on one blockchain. In which case, inter-bank transfer could be influenced by the user's intent and the specific requirements of the transaction. In an example, if the user wishes to use CBDC within the same blockchain ecosystem, the original CBDC will be prioritized; conversely, if the transaction involves cross-chain interactions, wrapped CBDC can be preferred because it is specifically designed for such purposes, and this preference can be established through either the user's mobile application, which can be configured to decide to use wrapped CBDC or native CBDC. Additionally, the user's client application, such as a mobile app, can automatically handle and determine operations choosing between using native CBDC and wrapped CBDC, automatically selecting the most appropriate asset type to simplify the user experience, which removes the technical complexity of selection by the user. As noted herein, in a variant embodiment, the smart contracts implementing the cross-chain protocol can be configured to include reward/penalty costs (e.g., gas costs) that encourage/discourage selecting of the most appropriate asset type by modifying ultimately the total cost to the user based on an adaptive value as noted in an example below.

In some embodiments, determination of whether original/native CBDC is will be transferred or wrapped CBDC will be transferred may be based on a global balance condition (ratio of wrapped vs. native CBDC for each pair of blockchains) generated by the observer nodes operating in concert to operate as an oracle signal for selection. For example, the observer nodes may couple with the global reconciliation network to issue a flag indicating that the transferring of wrapped CBDC should be prioritized to encourage burn/unlock operations to occur. Conversely, the flag can also be used to indicate that transferring of wrapped CBDC should be not be prioritized to discourage burn/unlock operations from occurring. The flag may be provided by a system oracle that can be polled or otherwise interacted with by any node or device, for example, indicative of system balance conditions and/or load conditions. For example, if burn/unlock operations are computationally costly, the technical benefit of being able to automatically encourage/discourage burn/unlock operations by controlling which of native or wrapped CBDC is transferred can be used as a blockchain-specific or across all chain load management or re-balancing mechanism. Another type of signal that can also be used is a measure of overall transactional load through proxy signals such as throughput (transactions/operations per second), processing/confirmation latency, among others.

By being able to adaptively manage cross-chain operations by encouraging/discouraging user client (such as a mobile app) operations to use wrapped CBDC or native CBDC selectively, an auto-balancing condition can be encouraged automatically or computational load can be selectively shifted based on available computing power, helping the system handle greater volumes and corresponding computational load for a given finite amount of computing resources available to operate a particular blockchain. This is especially important as blockchain operational costs have direct impacts on data center, computing requirements, and ultimately, environmental impact.

In a specific non-limiting example, it may be a holiday season where individuals are sending CBDC objects in the form of "red pockets" to other users, causing the one or more of the blockchains to have a high transaction load of small volume transactions. During this time, it may be preferable to discourage burn/unlock operations, and thus the transfer of wrapped CBDC should be discouraged to reduce overall system load. However, following the holiday season, volumes may have decreased, and the system may be configured to encourage burning/unlocking during a low load time. In this example, as the system observes a higher proportion of wrapped vs. native CBDC objects on the block chain, similarly, burn/unlock operations can be encouraged in an effort to automatically restore balance to the system to maintain the proportion of wrapped vs. native CBDC below a target threshold that can be managed by the system. In this example, a user may have 50 native CBDC and 50 wrapped CBDC in a wallet, and the user is transferring 20 CBDC of any time to another wallet on a user on a different blockchain. The user's device can automatically manage the distribution or proportion of which CBDC between the native and wrapped CBDC to transfer.

For inter-jurisdictional transfers, owing to the integrated cross-chain protocol at the base level of the blockchain, the system's interoperability is significantly enhanced. The cross-chain protocol allows the issuing bank's blockchain network to seamlessly connect with other public chains or CBDC networks that adopt the same cross-chain protocol. By joining a compatible interoperability platform, not only can value exchange be realized, but the flow of information and data between different blockchain systems can also be facilitated and adaptively controlled, laying the foundation for a more open and collaborative financial ecosystem that is able to technically scale to greater volumes through specialized configuration and control of the cross-chain protocol.

As technology evolves and market conditions change, the CBDC smart contract may need to be upgraded to accommodate new functional requirements or improvements. When the issuing bank determines that an upgrade to the smart contract is necessary, it will begin preparing for the upgrade process. The upgrade process can be used to swap out the underlying CBDC smart contracts that support the relayer 306 and the cross-chain protocol. In a variant embodiment, there may be a plurality of available CBDC smart contacts that are having different penalty/reward terms based on a oracle signal, and the upgrade process can be used to adaptively select between different penalty/reward terms to encourage different behavior. Accordingly, in this example, upgrading the smart contract by changing the proxy/smart contact pointer can be used by an administrator to explicitly encourage a desired balance. In an alternate variation, the smart contract itself can include an adaptive penalty/reward terms that automatically encourages different behavior (e.g., automatically increasing the penalty/reward proportionate to distance from a target state). In both of these variations, to minimize overall transaction costs, the user client (such as a mobile app) can automatically decide to use wrapped CBDC or native CBDC in a manner that corresponds to the desired balancing behavior.

Figure 4:
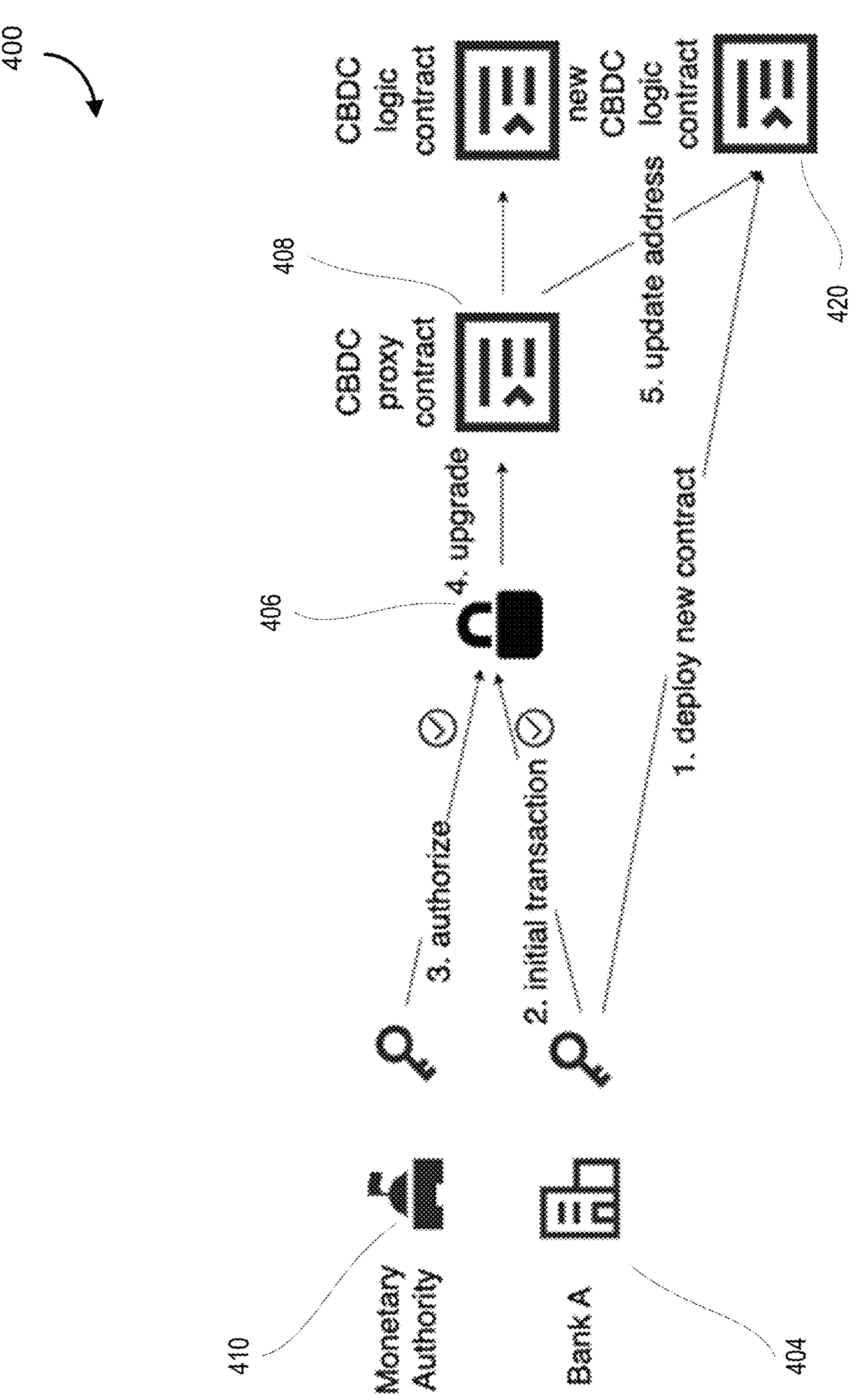
FIG. 4 is a block diagram of a system for multi-signature smart contract upgrades in accordance with some embodiments.

Referring to FIG. 4, block diagram illustrating aspects of a system for multi-signature smart contract upgrade in accordance with embodiments of the present disclosure is shown as a system 400. The issuing bank 404 first develops and tests the new smart contract code to ensure that it meets the expected functionality and security requirements. Once the new code is ready, the issuing bank deploys the new contract 420 to the blockchain network.

After deploying the new contract 420, the issuing bank initiates a transaction request for "upgrade CBDC" to the multi-signature wallet 406. The purpose of this request is to update the logic contract address in the existing proxy contract 408 to the address of the new smart contract 420.

In the smart contract upgrade system 400, government financial regulatory authorities such as monetary authority 410 may play a crucial role. The regulatory authorities may need to review the code of the new smart contract to ensure that it complies with all relevant laws, regulations, and security standards. In addition to the regulatory authorities, other issuing banks may also need to participate in the authorization process to jointly ensure the rationality and necessity of the upgrade. When the government financial regulatory authorities also agree and sign the "upgrade CBDC" transaction, the multi-signature wallet 406 then executes the transaction. This triggers the address update in the proxy contract 408 to point to the new logic contract 420. However, depending on the nature of the contract to be upgraded, the issuing bank may not even require consensus from other banks or even the regulatory authorities.

Once the transaction is executed, the address in the proxy contract 408 is updated to that of the new logic contract 420. This marks the official upgrade of the smart contract, and the new features and improvements immediately take effect for the CBDC across the entire network.

Blockchain technology has the inherent capability to encrypt transaction data, ensuring the authenticity and immutability of transactions without disclosing user identity information. Transactions on the blockchain are conducted through addresses, not directly linked to personal identity information, thus providing a certain level of anonymity for user transactions. Since each blockchain is managed by the issuing bank itself, other issuing banks do not have the right to view transaction information on the blockchain. This separation fully protects the privacy of customer data within the issuing bank. Although regulatory nodes can monitor transactions, they typically adhere to strict privacy protection regulations and standards, ensuring that customer privacy rights are not violated while maintaining regulatory compliance. Every transaction on the blockchain is traceable, which helps in tracking and locating issues in the event of security incidents, while ensuring that only authorized auditors can access this information. Smart contracts can automatically execute the terms of transactions, reducing intermediary steps and lowering the risk of privacy breaches due to human factors.

Figure 5:
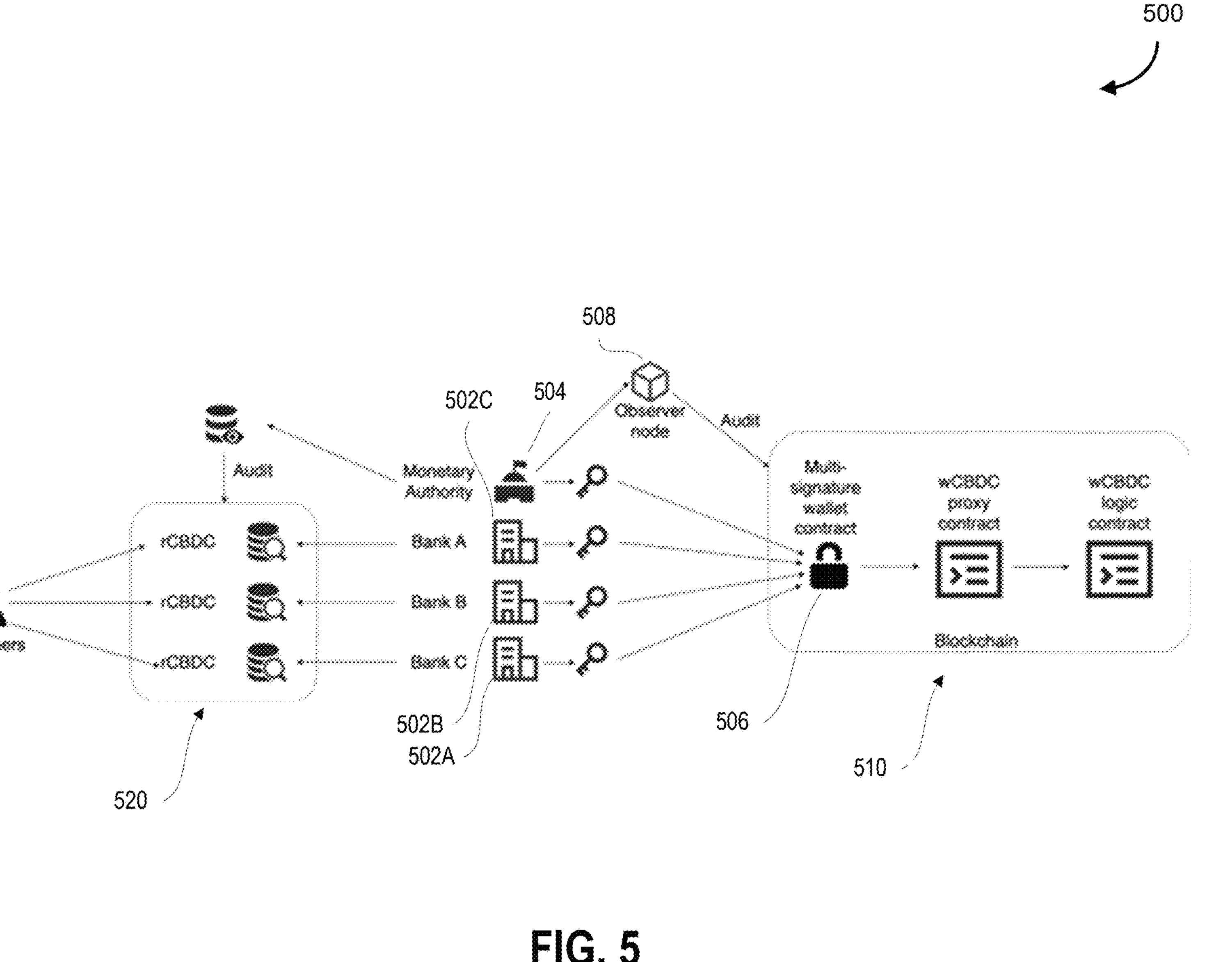
FIG. 5 is a block diagram of a system for wholesale CBDC issuance and transactions in accordance with some embodiments.

As shown in FIG. 5, according to some embodiments, the proposed system can deploy a wholesale network 500 that contains one wholesale CBDC block chain that is jointly maintained by all issuing banks502A, 502B, and 502C. In this network 500, only nodes that have passed strict approval are allowed to participate, ensuring the security and compliance of the system. To achieve interoperability with external networks, the underlying blockchain of this plan also supports cross-chain protocols.

These authorized nodes share the responsibility of decision-making and execution, and they collaborate to issue a wholesale CBDC smart contract 510. This smart contract is the core of CBDC issuance and management, providing basic currency management functions, including issuance, transaction recording, redemption, and upgrades. Real-time settlement between different issuing banks is achieved through smart contracts, which speeds up the flow of funds and improves the operational efficiency of the financial system.

Retail business facing ordinary consumers still relies on the banks' original IT systems 520, minimizing changes to the existing financial system and reducing transformation costs and risks.

As CBDC is an asset managed collectively by multiple parties, its management involves multiple stakeholders, including but not limited to government financial regulatory authorities such as monetary authority 504 and other issuing banks 502. Key transactions require multi-party authorization. To meet this need, the network 500 utilizes multi-signature wallet 506. This technology ensures that transactions can only be executed when the private keys held by government monetary authorities 504 and issuing banks 502 are jointly involved. Each private key holder has a share of the multi-signature wallet 506, increasing the security and compliance of transactions.

The central bank, as the direct manager of the main chain, ensures the security of the digital currency system and financial compliance. For effective supervision and regulation by monetary authorities, the proposed system introduces observer nodes 508 into the wholesale blockchain, equipping financial regulatory bodies with more advanced supervisory capabilities. Observer nodes can track and analyze the flow of digital currency in real time, ensuring the transparency and compliance of transactions. This real-time monitoring mechanism greatly improves the efficiency of supervision, enabling regulatory bodies to quickly identify and respond to potential financial risks and non-compliant operations, thereby safeguarding the stability and security of the financial market.

In the design of the CBDC smart contract, functions related to administrators play a crucial role. For example, the "mint CBDC" function allows authorized financial regulatory authorities or banks to create new CBDC according to economic policies and market demand. In addition, the "upgrade contract" function allows necessary upgrades or modifications to the smart contract code to adapt to new regulations, technical updates, or bug fixes. Such upgrades typically require a rigorous review and approval process.

When key operations such as "mint CBDC" or "upgrade contract" need to be performed, transactions must be co-signed by multiple private key holders. The transaction must reach a preset signature threshold to be executed. This means that a sufficient number of authorized entities must agree for the transaction to be accepted by the blockchain network. Once the signature threshold is reached, the transaction will be automatically executed, and the corresponding smart contract function will be called. This approach not only enhances the security of the system but also increases transparency because all parties involved can view the progress and status of the transaction.

Multi-signature wallet technology also helps ensure that all operations comply with preset rules and standards, thereby enhancing the compliance of the CBDC system. This design ensures that only authorized entities can perform key operations while protecting the entire system from unauthorized interference.

Figure 6:
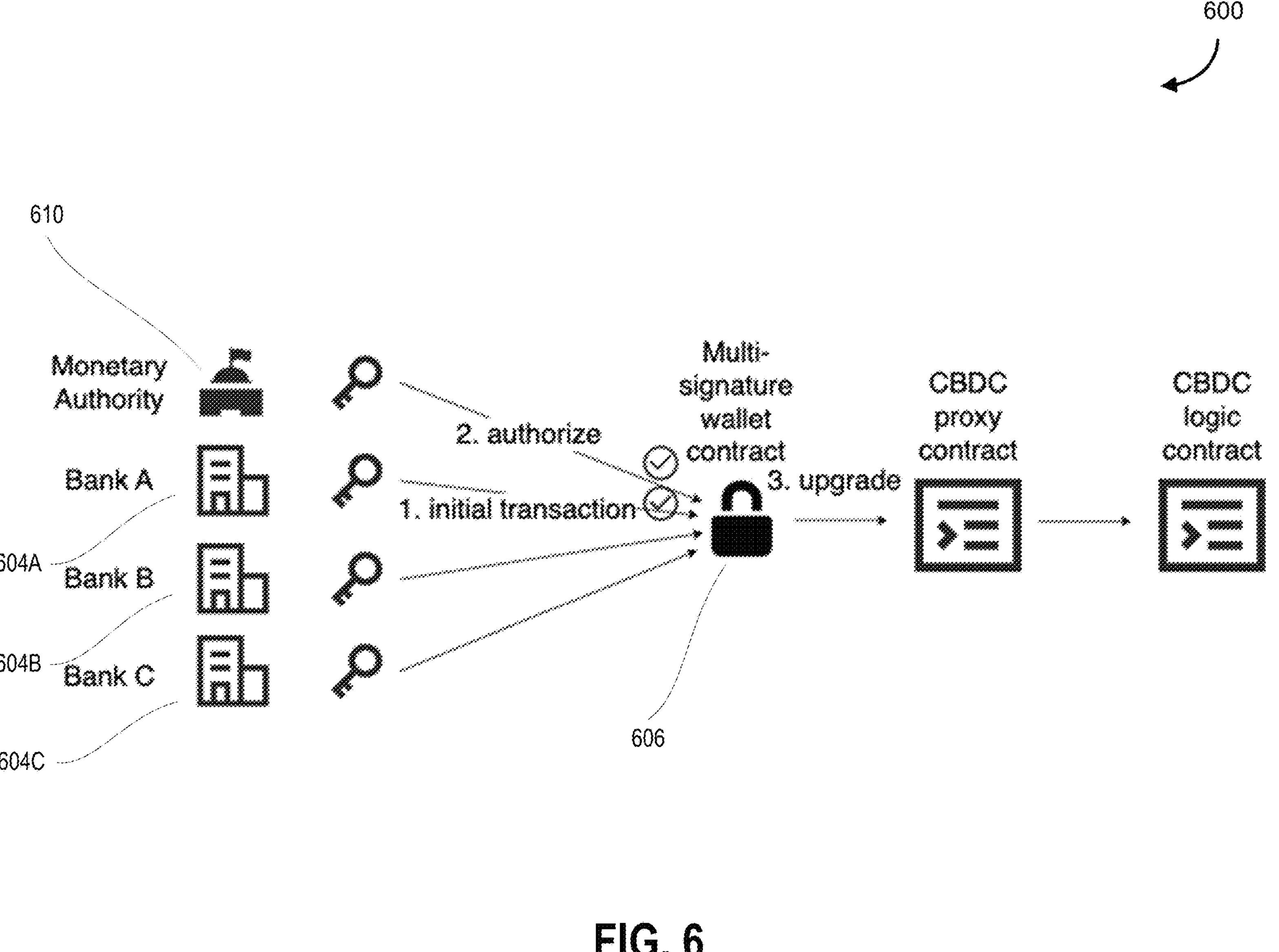
FIG. 6 is a block diagram of a system for wholesale CBDC issuance in accordance with some embodiments.

Referring to FIG. 6, block diagram illustrating aspects of a system for issuing CBCD in accordance with embodiments of the present disclosure is shown as a system 600. Before issuing CBDC, the issuing banks 604A, 604B, and 604C must undertake some preparatory work. Initially, the bank must ensure that it has sufficient currency reserves, which are typically held in the form of fiat money. These reserves must be deposited into a designated institution or fund at a predesignated ratio to ensure that the value of the CBDC is fully supported. This ratio is generally set at 1:1.

Once the currency reserves are in place, the issuing bank 604 initiates a "mint CBDC" transaction request to the multi-signature wallet 606. This request is an initial transaction that marks the beginning of the CBDC issuance process. The transaction request includes the quantity of CBDC to be issued and the associated metadata.

Government financial regulatory authorities such as monetary authority 610play a key role in the CBDC issuing system 600. They need to review the currency reserves and issuance requests submitted by the issuing bank 604. The regulatory authorities check whether the newly added currency reserves match the quantity of CBDC to be issued and ensure that all internal approval processes have been completed.

Once the monetary authorities 610 have confirmed the consistency of the currency reserves and issuance request, and the internal approval processes have been passed, they initiate a second transaction, the "authorize" transaction. This transaction is an authorization confirmation for the issuing bank's "mint CBDC" transaction.

In the multi-signature wallet 606, a transaction must reach a preset signature threshold to be executed. If the number of signing entities reaches this threshold when the monetary authority 610 initiates the authorization transaction, then the "mint CBDC" transaction will be automatically executed.

With the automatic execution of the "mint CBDC" transaction, new CBDC is successfully minted and added into circulation. This process not only ensures that the issuance of CBDC is transparent and compliant but also improves the security and efficiency of the entire procedure.

For intra-bank transfers, the CBDC smart contract transfer function can be utilized directly.

For inter-bank transfers, if a user holds electronic currency from one bank and decides to move it to another bank's account, the process begins with the user initiating a transaction at the source bank, with the goal of transferring these electronic funds to the target bank. The source bank first verifies the validity of the transaction and transfers the CBDC to the account at the target bank. Upon receiving the transaction information, the target bank then moves the currency to the user's address within its internal account system.

The underlying blockchain's integrated cross-chain protocol significantly enhances the system's interoperability. It allows the issuing bank's blockchain network to seamlessly connect with other public chains or CBDC networks that adopt the same cross-chain protocol. By joining a compatible interoperability platform, not only can value exchange be realized, but the flow of information and data between different blockchain systems can also be facilitated, laying the foundation for a more open and collaborative financial ecosystem.

As technology advances and market conditions evolve, the CBDC smart contract may need to be upgraded to accommodate new functional requirements or improvements. When the issuing bank determines that an upgrade to the smart contract is necessary, it begins preparing for the upgrade process.

Figure 7:
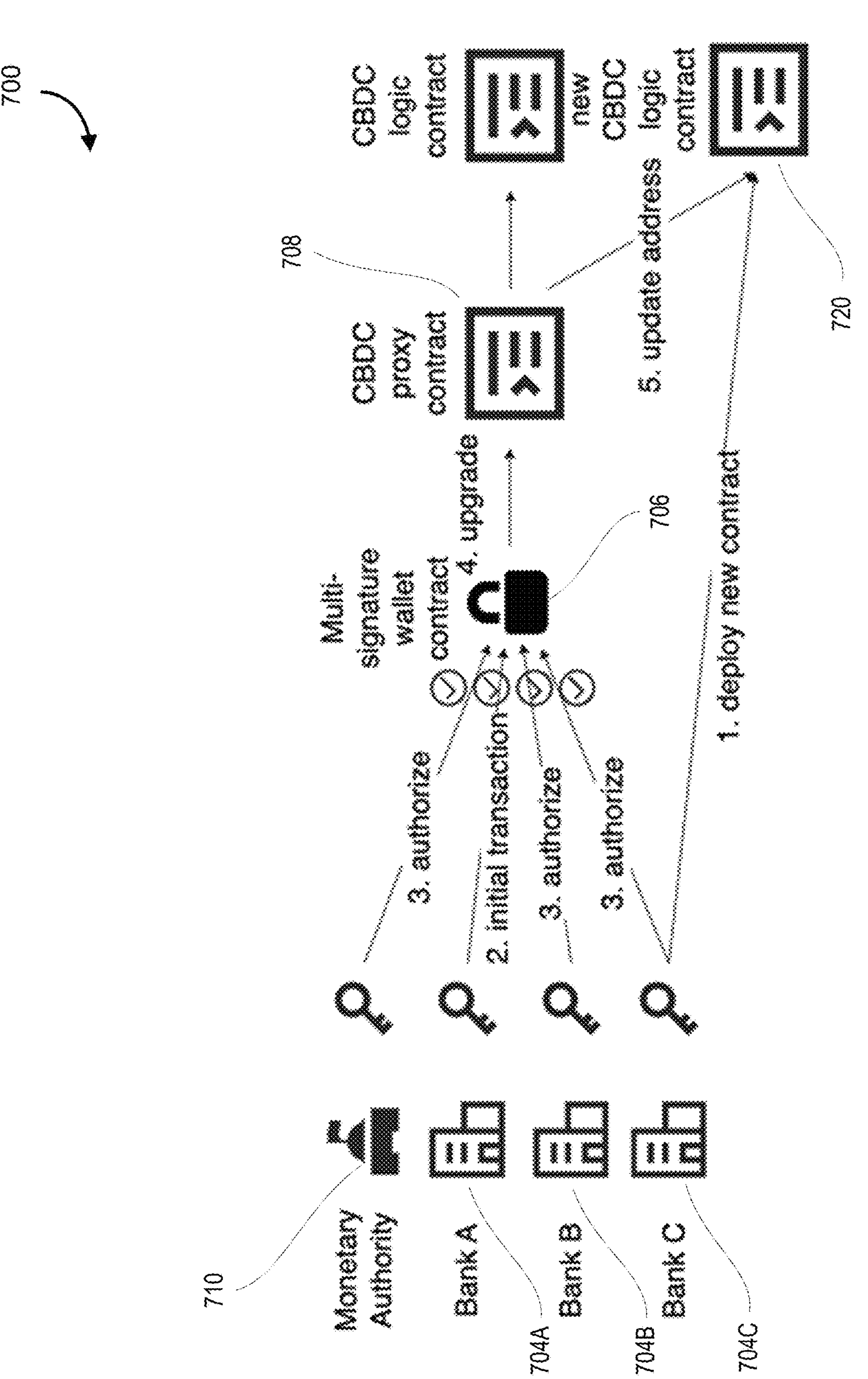
FIG. 7 is a block diagram of a system for multi-signature smart contract upgrades in accordance with some embodiments.

Referring to FIG. 7, block diagram illustrating aspects of a system for CBDC wholesale smart contract upgrades in accordance with some embodiments is shown as a system 700. The issuing banks 704A, 704B, and 704C first need to develop and test the new logic contract 720 to ensure that the new code meets the expected functionality and security requirements. Once the new code is ready, the issuing bank 704 deploys it to the blockchain network.

After deploying the new contract 720, the issuing bank 704 initiates an "upgrade CBDC" transaction request to the multi-signature wallet 706. The purpose of this request is to update the logic contract address in the existing proxy contract 708 to that of the new logic contract 720.

Since the upgrade of the wholesale smart contract involves CBDC across the entire network, the threshold requirement for transactions is relatively high. This means that more authorized entities need to co-sign the transaction to ensure the legitimacy and security of the upgrade process. These entities could include not only government authorities such as monetary authority 710 but also other issuing banks 704 and financial institutions.

In the CBDC wholesale smart contract upgrade system 700, monetary authorities 710 play an essential role. The regulatory authorities 710 may need to review the code of the new smart contract 720 to ensure that it complies with all relevant laws, regulations, and security standards. In addition to the regulatory authorities, other issuing banks 704 may also need to participate in the authorization process to jointly ensure the rationality and necessity of the upgrade.

When all necessary authorized entities, including government financial regulatory authorities such as monetary authority 710 and other issuing banks 704, have agreed to and signed the "upgrade CBDC" transaction, the multi-signature wallet 706 then executes the transaction. This automatically triggers the address update in the proxy contract to point to the new logic contract 720.

Once the transaction is executed, the address in the proxy contract is updated to the new smart contract address. This marks the official upgrade of the smart contract, and the new features and improvements take effect immediately for the CBDC across the entire network.

Blockchain technology has the inherent capability to encrypt transaction data, ensuring the authenticity and immutability of transactions without disclosing user identity information. Transactions on the blockchain are conducted through addresses, not directly linked to personal identity information, thus providing a certain level of anonymity for user transactions. Since each blockchain is managed by the issuing bank itself, other issuing banks do not have the right to view transaction information on the blockchain. This separation fully protects the privacy of customer data within the issuing bank. Although regulatory nodes can monitor transactions, they typically adhere to strict privacy protection regulations and standards, ensuring that customer privacy rights are not violated while maintaining regulatory compliance. Every transaction on the blockchain is traceable, which helps in tracking and locating issues in the event of security incidents, while ensuring that only authorized auditors can access this information. Smart contracts can automatically execute the terms of transactions, reducing intermediary steps and lowering the risk of privacy breaches due to human factors.

The table below is a comparison of the two embodiments in terms of privacy, regulation, and implementation difficulty:

| | CBDC Blockchain Network | CBDC Wholesale Blockchain |
|---|---|---|
| Privacy Protection | All transaction records are stored on the blockchain managed by each issuing bank, ensuring that customer information is not disclosed to other banks. | Only the wholesale CBDC is on the jointly maintained blockchain, while customer-related transaction records are only maintained on the banks' internal systems. |
| Financial Regulation | Financial regulatory bodies can directly set up observer nodes to monitor the blockchain in real time. | Regulatory authorities can establish observer nodes to oversee the wholesale CBDC blockchain continuously, while also conducting regular audits of the banks' internal transaction records. |
| Implementation | The existing financial systems of banks must be integrated with the blockchain. | Only the wholesale CBDC operates on the blockchain and the retail CBDC continues to utilize the banks' existing systems. The difficulty of system modification is reduced. |

Overall, the proposed system and the embodiments bring many beneficial effects. Firstly, through the application of cross-chain technology, the system achieves real-time settlement between multiple note-issuing banks, significantly enhancing liquidity and operational convenience. This instant settlement mechanism eliminates the need for intermediaries in settlements between commercial banks, thereby addressing trust issues in the financial system, reducing transaction costs, and accelerating the speed of fund circulation.

Secondly, independently deployed blockchain technology provides a new solution that effectively addresses concerns among commercial banks in traditional consortium CBDC solutions regarding the leakage of customer data to competitors. By encrypting data and managing permissions on the blockchain, the security and privacy of data are ensured.

Additionally, the support for deploying dedicated chains enables the system to more effectively handle large-scale transaction activities. Each specific activity, third-party payment channel, or institution can deploy an independent dedicated chain. This not only enhances the system's ability to handle high-concurrency transactions but also ensures the stability of the main chain when processing routine transactions, avoiding the impact of transaction peaks caused by specific activities on the overall system stability.

Furthermore, the application of a unified open-source cross-chain protocol greatly promotes the application of CBDCs in cross-border transactions. The uniformity of this protocol reduces technical barriers, making it easier for other countries to accept and use CBDC, thus expanding the boundaries of transactions, increasing possibilities for transactions, and providing new impetus for global economic interconnectedness.

Lastly, multi-signature wallets also play an important role in the proposed system. Multi-signature wallet technology significantly enhances protection against potential fraudulent activities and unauthorized transactions. It requires transactions to be approved by multiple authorized parties before they can be executed, especially those that involve large amounts of funds. This mechanism not only strengthens the security of transactions but also increases the transparency of the transaction process. Each transaction requires confirmation from multiple parties, and each confirmation step is recorded on the blockchain, allowing all authorized parties to view and audit transaction records in real time, ensuring the fairness and traceability of transactions.

The application of multi-signature wallets also reinforces the compliance of financial activities. Regulatory authorities can participate as one of the signing parties in the verification of important transactions, ensuring that each operation complies with laws and regulations. This mechanism additionally facilitates internal and external audits, as auditors can easily access a complete and tamper-proof transaction history, increasing the transparency and compliance of the system.

Multi-signature wallets also support flexible configurations, allowing financial institutions to customize the required number of signatures and participants according to the needs of different products, services, or partners. This flexibility enables the system to better adapt to a variety of financial products and services while adjusting security control levels according to business needs. In a multi-issuing bank CBDC system, multi-signature wallets also promote trust building between different financial institutions. Participating institutions must work together to jointly approve key cross-institutional operations, thereby strengthening the trust relationship between partners and reducing potential confrontational risks. Overall, multi-signature wallets are key tools for enhancing security and cooperation in modern digital currency systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-7) may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a processor, a digital signal processor (DSP), an ASIC), a field programmable gate array (FPGA) or other programmable logic device, discrete gate or transistor logic, discrete hardware components, or combinations thereof designed to perform the functions described herein. A processor may be a microprocessor, but in the alternative, the processor may be another form of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a computer, or a processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A computer system for interoperability between a plurality of blockchains using cross-chain data message communication, the computer system comprising:

- a computer processor operating as a computing node configured to maintain a copy of a distributed ledger data structure updated in accordance with a consensus protocol for a first distributed ledger data structure, the computer processor operating in conjunction with computer memory and a non-transitory computer data storage, the computer processor configured to:

receive a signed transaction request corresponding to a request to transfer a digital object represented on the first distributed ledger data structure to a second distributed ledger data structure;

verify the signed transaction request signed by a private key using a corresponding public key;

modify a data field parameter on the digital object being transferred to change the digital object state representation to locked and generate a locked object identifier and a signed locking attestation;

initiate a cross-chain transaction by calling a relayer subroutine to forward a data object of transaction information to a target computing node associated with the second distributed ledger data structure, the data object of transaction information including the signed locking attestation, the target computing node generating a corresponding wrapped digital object on the second distributed ledger data structure as a wrapped representation of the digital object being transferred, the corresponding wrapped digital object including as a data record payload the signed locking attestation and the locked object identifier;

receive, from the relayer subroutine, a second signed transaction request corresponding to the wrapped digital object representing a request to transfer back the digital object originally represented on the first distributed ledger data structure from the second distributed ledger data structure;

verify the second signed transaction request signed by a second private key using a corresponding second public key;

identify a corresponding locked digital object using the data record payload of the wrapped digital object;

modify the data field parameter on the digital object being returned to change the digital object state representation of the corresponding locked digital object to unlocked; and conduct a burn process to change the state of the wrapped digital object to a burned state where the wrapped digital object cannot be further transferred between public addresses corresponding to digital wallets.

2. The computer system of claim 1, wherein processing a request to transfer a plurality of digital objects represented on the first distributed ledger data structure to a second distributed ledger data structure, any available wrapped digital objects on the first distributed ledger data structure are utilized and burned before using the relayer subroutine to generate any additional new wrapped digital objects.

3. The computer system of claim 1, wherein the burn process includes transferring the wrapped digital object to a public key associated with a burn address on the first distributed ledger data structure.

4. The computer system of claim 1, wherein the data record payload of the corresponding wrapped digital object and a data record payload of the locked digital object are both updated to include a cross-chain transaction identifier, a public key corresponding to a digital wallet on the first distributed ledger data structure, and a public key corresponding to a digital wallet on the second distributed ledger data structure.

5. The computer system of claim 4, wherein the data record payload of the corresponding wrapped digital object and the data record payload locked digital object are accessible by an observer node through traversal of the first distributed ledger data structure and the second distributed ledger data structure, the observer node configured to use the data record payload to reconcile transactions on each of the first distributed ledger data structure and the second distributed ledger data structure individually and between the first distributed ledger data structure and the second distributed ledger data structure.

6. The computer system of claim 1, wherein the computing node is configured for periodic upgrades of a smart contract data object including logical instruction sets for conducting the cross-chain transaction.

7. The computer system of claim 6, wherein the smart contract data object includes a first proxy smart contract and a second underlying logic smart contract, the first proxy smart contract operating as a pointer to the second underlying logic smart contract.

8. The computer system of claim 7, wherein when an update is to be made to the logical instruction sets for conducting the cross-chain transaction, a third underlying logic smart contract is instantiated, and the first proxy smart contract is configured to update the pointer to the third underlying logic smart contract.

9. The computer system of claim 1, wherein the computing node is in electronic communication with a plurality of other distributed computing nodes that periodically communicate state updates as data message objects with one another, and update the first distributed ledger data structure in accordance with a consensus protocol operating on all of the computing nodes that enforces that states of the first distributed ledger data structure on all of the computing nodes each represent a same sequence of transactions.

10. The computer system of claim 1, further comprising an observer node configured to monitor operation of the cross-chain transaction, the observer node generating records of all lock and unlock transactions on the first distributed ledger data structure and all mint wrapped and burn wrapped transactions on the second distributed ledger data structure.

11. A method for interoperability between a plurality of blockchains using cross-chain data message communication, the method comprising:

receiving, by a computer processor operating as a computing node configured to maintain a copy of a distributed ledger data structure updated in accordance with a consensus protocol for a first distributed ledger data structure, a signed transaction request corresponding to a request to transfer a digital object represented on the first distributed ledger data structure to a second distributed ledger data structure;

verifying the signed transaction request signed by a private key using a corresponding public key;

modifying a data field parameter on the digital object being transferred to change the digital object state representation to locked and generate a locked object identifier and a signed locking attestation;

initiating a cross-chain transaction by calling a relayer subroutine to forward a data object of transaction information to a target computing node associated with the second distributed ledger data structure, the data object of transaction information including the signed locking attestation, the target computing node generating a corresponding wrapped digital object on the second distributed ledger data structure as a wrapped representation of the digital object being transferred, the corresponding wrapped digital object including as a data record payload the signed locking attestation and the locked object identifier;

receiving, from the relayer subroutine, a second signed transaction request corresponding to the wrapped digital object representing a request to transfer back the digital object originally represented on the first distributed ledger data structure from the second distributed ledger data structure;

verifying the second signed transaction request signed by a second private key using a corresponding second public key;

identifying a corresponding locked digital object using the data record payload of the wrapped digital object;

modifying the data field parameter on the digital object being returned to change the digital object state representation of the corresponding locked digital object to unlocked; and conducting a burn process to change the state of the wrapped digital object to a burned state where the wrapped digital object cannot be further transferred between public addresses corresponding to digital wallets.

12. The method of claim 11, wherein processing a request to transfer a plurality of digital objects represented on the first distributed ledger data structure to a second distributed ledger data structure, any available wrapped digital objects on the first distributed ledger data structure are utilized and burned before using the relayer subroutine to generate any additional new wrapped digital objects.

13. The method of claim 11, wherein the burn process includes transferring the wrapped digital object to a public key associated with a burn address on the first distributed ledger data structure.

14. The method of claim 11, wherein the data record payload of the corresponding wrapped digital object and a data record payload of the locked digital object are both updated to include a cross-chain transaction identifier, a public key corresponding to a digital wallet on the first distributed ledger data structure, and a public key corresponding to a digital wallet on the second distributed ledger data structure.

15. The method of claim 14, wherein the data record payload of the corresponding wrapped digital object and the data record payload locked digital object are accessible by an observer node through traversal of the first distributed ledger data structure and the second distributed ledger data structure, the observer node configured to use the data record payload to reconcile transactions on each of the first distributed ledger data structure and the second distributed ledger data structure individually and between the first distributed ledger data structure and the second distributed ledger data structure.

16. The method of claim 11, wherein a computing node is configured for periodic upgrades of a smart contract data object including logical instruction sets for conducting the cross-chain transaction.

17. The method of claim 16, wherein the smart contract data object includes a first proxy smart contract and a second underlying logic smart contract, the first proxy smart contract operating as a pointer to the second underlying logic smart contract.

18. The method of claim 17, wherein when an update is to be made to the logical instruction sets for conducting the cross-chain transaction, a third underlying logic smart contract is instantiated, and the first proxy smart contract is configured to update the pointer to the third underlying logic smart contract.

19. The method of claim 11, further comprising automatically determining, based on a transactional load or wrapped/native balance of the first distributed ledger data structure or the second distributed ledger data structure, whether to use wrapped digital objects corresponding to the second distributed ledger data structure or native digital objects in processing a transfer request.

20. A non-transitory, computer readable medium storing machine executable instructions, which when executed by a processor, cause the processor to perform a method for interoperating a plurality of blockchains using cross-chain data message communication, the method comprising:

receiving, by a computer processor operating as a computing node configured to maintain a copy of a distributed ledger data structure updated in accordance with a consensus protocol for a first distributed ledger data structure, a signed transaction request corresponding to a request to transfer a digital object represented on the first distributed ledger data structure to a second distributed ledger data structure;

verifying the signed transaction request signed by a private key using a corresponding public key;

modifying a data field parameter on the digital object being transferred to change the digital object state representation to locked and generate a locked object identifier and a signed locking attestation;

initiating a cross-chain transaction by calling a relayer subroutine to forward a data object of transaction information to a target computing node associated with the second distributed ledger data structure, the data object of transaction information including the signed locking attestation, the target computing node generating a corresponding wrapped digital object on the second distributed ledger data structure as a wrapped representation of the digital object being transferred, the corresponding wrapped digital object including as a data record payload the signed locking attestation and the locked object identifier;

receiving, from the relayer subroutine, a second signed transaction request corresponding to the wrapped digital object representing a request to transfer back the digital object originally represented on the first distributed ledger data structure from the second distributed ledger data structure;

verifying the second signed transaction request signed by a second private key using a corresponding second public key;

identifying a corresponding locked digital object using the data record payload of the wrapped digital object;

modifying the data field parameter on the digital object being returned to change the digital object state representation of the corresponding locked digital object to unlocked; and conducting a burn process to change the state of the wrapped digital object to a burned state where the wrapped digital object cannot be further transferred between public addresses corresponding to digital wallets.

* * * * *